US012308160B2

(12) United States Patent
Oh et al.

(10) Patent No.: US 12,308,160 B2
(45) Date of Patent: May 20, 2025

(54) COIL COMPONENT

(71) Applicant: SAMSUNG ELECTRO-MECHANICS CO., LTD., Suwon-si (KR)

(72) Inventors: Sung Kwon Oh, Suwon-si (KR); In Young Kang, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 663 days.

(21) Appl. No.: 17/735,354

(22) Filed: May 3, 2022

(65) Prior Publication Data

US 2023/0119250 A1 Apr. 20, 2023

(30) Foreign Application Priority Data

Oct. 14, 2021 (KR) ........................ 10-2021-0136421

(51) Int. Cl.
*H01F 27/29* (2006.01)
*H01F 17/00* (2006.01)
*H01F 17/04* (2006.01)

(52) U.S. Cl.
CPC ....... *H01F 27/292* (2013.01); *H01F 17/0013* (2013.01); *H01F 17/045* (2013.01); *H01F 2017/048* (2013.01)

(58) Field of Classification Search
CPC .. H01F 27/292; H01F 17/0013; H01F 17/045; H01F 2017/048
See application file for complete search history.

(56) References Cited

U.S. PATENT DOCUMENTS

| | | | | |
|---|---|---|---|---|
| 10,224,138 | B2 * | 3/2019 | Lee | H01F 27/292 |
| 2007/0242416 | A1 * | 10/2007 | Saito | H01G 4/2325 361/321.1 |
| 2015/0115776 | A1 * | 4/2015 | Terashita | H01C 7/008 336/200 |
| 2016/0042857 | A1 * | 2/2016 | Chun | H01F 17/04 336/200 |
| 2018/0268990 | A1 * | 9/2018 | Lee | H01F 27/29 |
| 2018/0308628 | A1 * | 10/2018 | Muneuchi | H01F 27/2828 |

(Continued)

FOREIGN PATENT DOCUMENTS

KR 10-2025708 B1 9/2019

*Primary Examiner* — Malcolm Barnes
(74) *Attorney, Agent, or Firm* — Morgan, Lewis & Bockius LLP

(57) ABSTRACT

A coil component includes: a body having one surface and the other surface opposing each other, and one end surface and the other end surface; a wound coil disposed in the body; first and second lead-out portions extending from opposite ends of the wound coil to one surface of the body; and first and second external electrodes disposed on the body and connected to the first and second lead-out portions, respectively, each formed to have a plurality of layers, wherein the first and second external electrodes include first and second pad portions and connected to the first and second lead-out portions, respectively, and first and second extension portions disposed on one end surface and the other end surface of the body, respectively, and first layers of the first and second extension portions are conductive resin layers, and first layers of the first and second pad portions are first metal layers.

19 Claims, 5 Drawing Sheets

1000

I-I'

(56) References Cited

U.S. PATENT DOCUMENTS

| | | | | |
|---|---|---|---|---|
| 2018/0337001 | A1* | 11/2018 | Tozawa | H01F 27/29 |
| 2020/0281078 | A1* | 9/2020 | Takahashi | H01F 17/0013 |
| 2020/0335262 | A1* | 10/2020 | Tonogai | H01F 27/255 |
| 2021/0313106 | A1* | 10/2021 | Noumi | H01F 27/292 |

* cited by examiner

COIL COMPONENT

CROSS-REFERENCE TO RELATED APPLICATION(S)

This application claims benefit of priority to Korean Patent Application No. 10-2021-0136421 filed on Oct. 14, 2021 in the Korean Intellectual Property Office, the disclosure of which is incorporated herein by reference in its entirety.

TECHNICAL FIELD

The present disclosure relates to a coil component.

BACKGROUND

A coil component includes a wire-wound coil component using a magnetic mold and a wire-wound coil. The wire-wound coil component uses a wound coil in which a metal wire with an insulating coating layer formed on a surface thereof is wound in a coil shape.

Meanwhile, in many coil components of which sizes and thicknesses are small, external electrodes are formed only on mounting surfaces. However, in order to improve mechanical properties such as resistance to vibrations or impacts and enhance fixing strength, there has been a demand for L-type external electrodes extending to side surfaces of a body.

SUMMARY

An aspect of the present disclosure may provide a coil component not only having improved electrical conductivity and fixing strength between lead-out portions and external electrodes, but also having strong resistance to vibrations or impacts when the coil component is mounted on a board.

According to an aspect of the present disclosure, a coil component may include: a body having one surface and the other surface opposing each other, and one end surface and the other end surface each connecting the one surface and the other surface to each other and opposing each other; a wound coil disposed in the body; first and second lead-out portions extending from opposite ends of the wound coil to one surface of the body and spaced apart from each other; and first and second external electrodes disposed on the body and connected to the first and second lead-out portions, respectively, each formed to have a plurality of layers, wherein the first and second external electrodes include first and second pad portions spaced apart from each other on one surface of the body and connected to the first and second lead-out portions, respectively, and first and second extension portions extending from the first and second pad portions and disposed on one end surface and the other end surface of the body, respectively, and first layers of the first and second extension portions are conductive resin layers, and first layers of the first and second pad portions are first metal layers.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
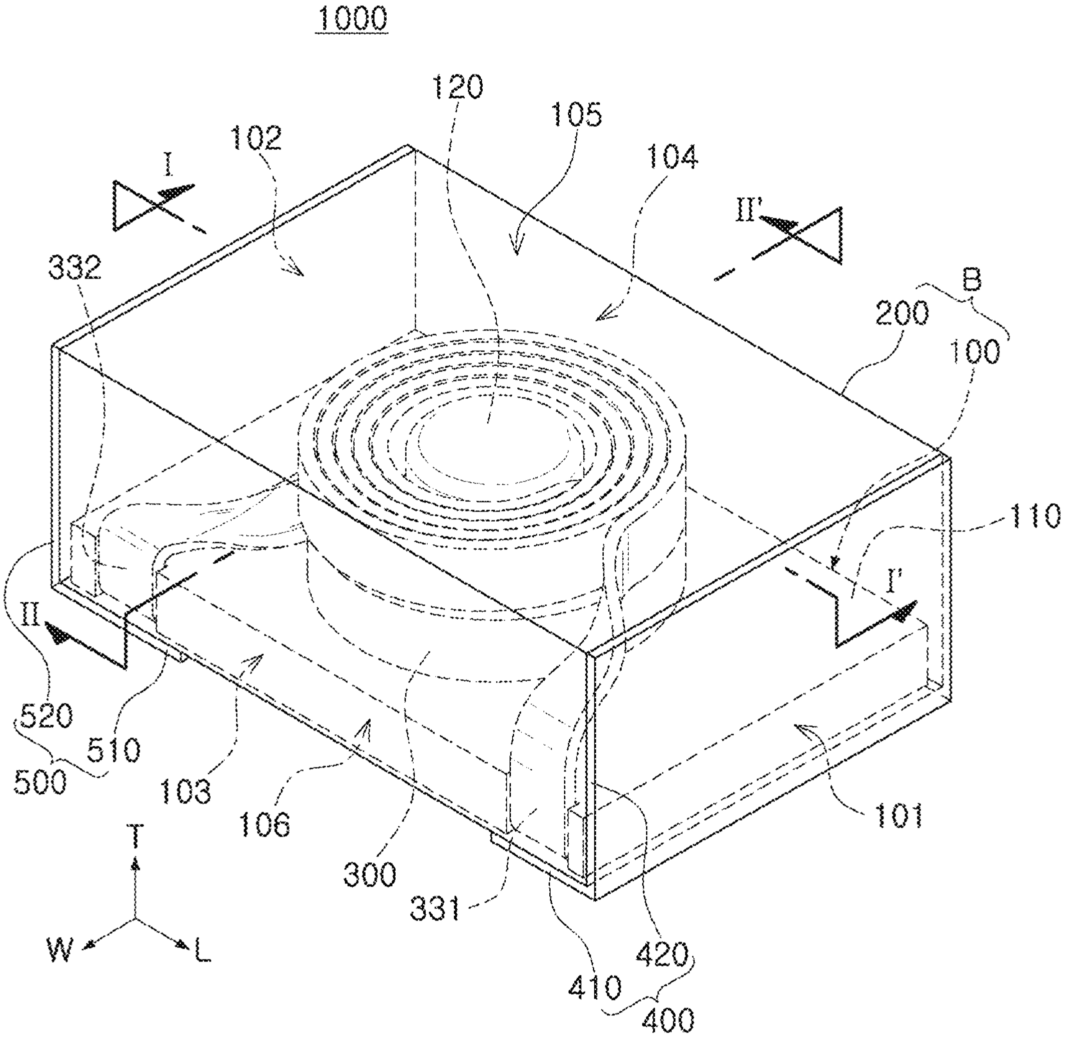
FIG. 1 is a schematic perspective view illustrating a coil component according to a first exemplary embodiment in the present disclosure.

Hereinafter, exemplary embodiments in the present disclosure will now be described in detail with reference to the accompanying drawings.

In the drawings, an L direction may be defined as a first direction or a length direction, a W direction may be defined as a second direction or a width direction, and a T direction may be defined as a third direction or a thickness direction.

Various kinds of electronic components may be used in electronic devices, and various kinds of coil components may be appropriately used between these electronic components to remove noise or for other purposes.

That is, in the electronic devices, the coil components may be used as power inductors, high frequency (HF) inductors, general beads, high frequency (GHz) beads, common mode filters, and the like.

First Exemplary Embodiment

Figure 2:
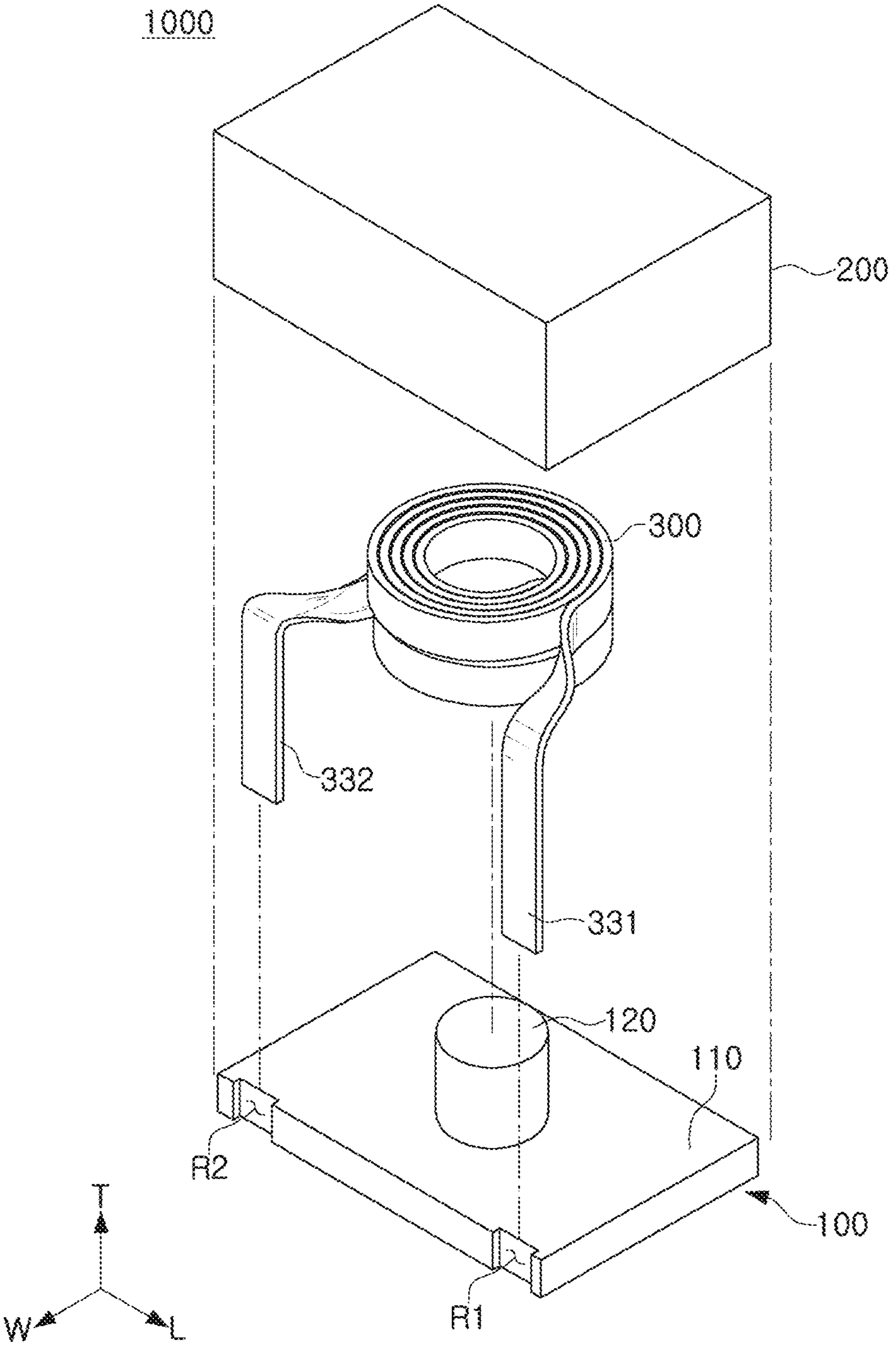
FIG. 2 is an exploded perspective view of FIG. 1.
Figure 3:
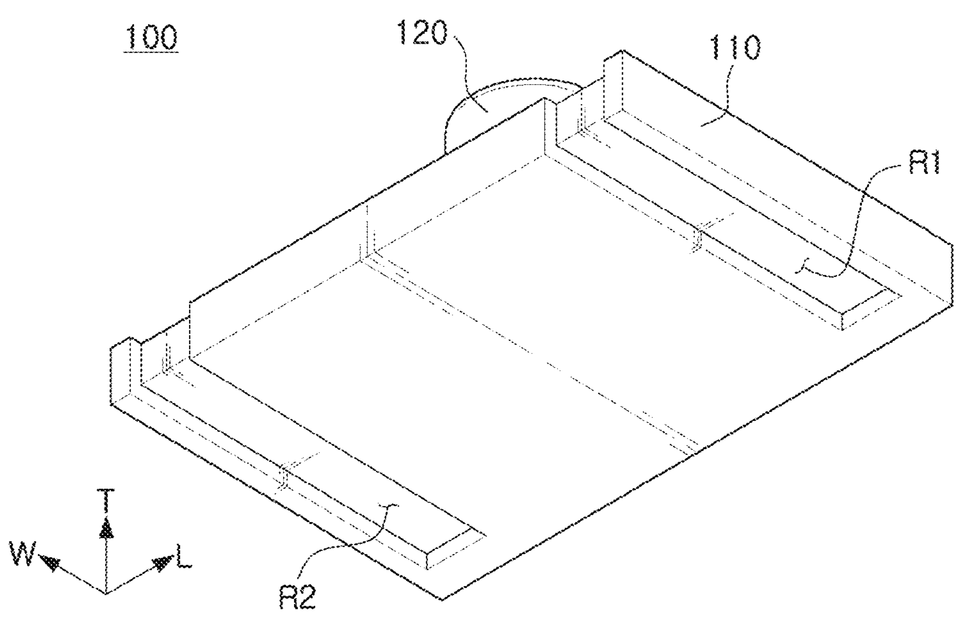
FIG. 3 is a view illustrating a mold portion of FIG. 1 when viewed from below.
Figure 4:
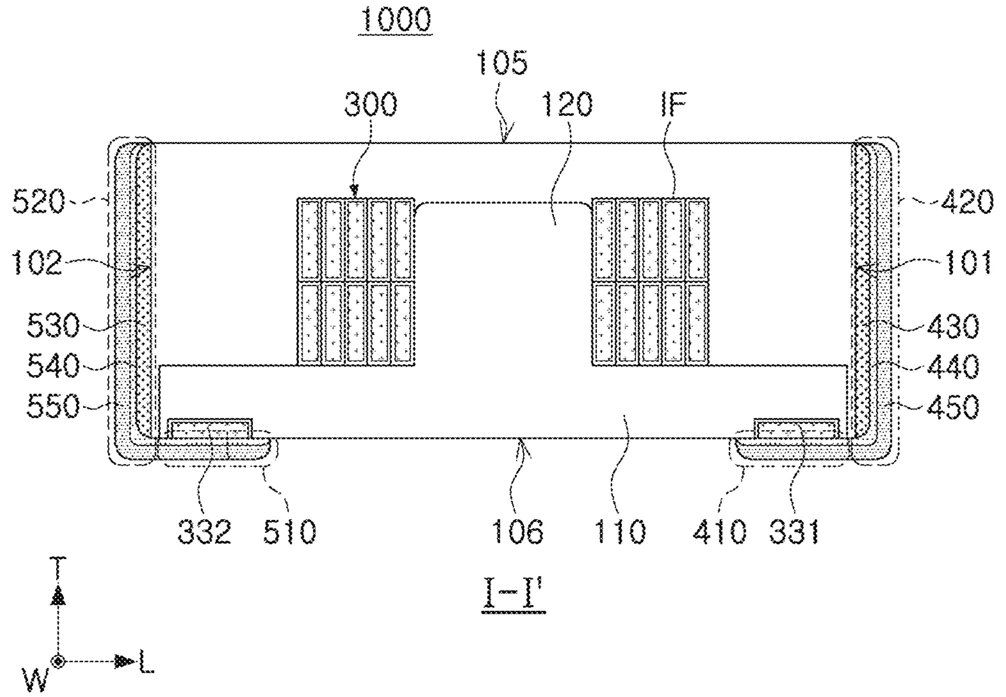
FIG. 4 is a cross-sectional view of FIG. 1 taken along line I-I'.
Figure 5:
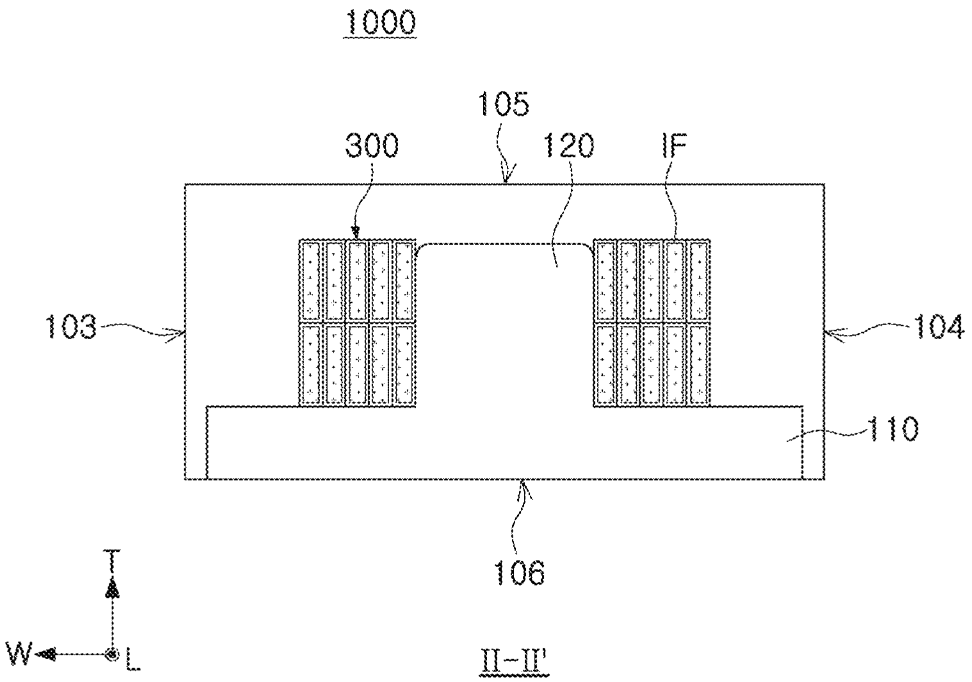
FIG. 5 is a cross-sectional view of FIG. 1 taken along line II-II'.

FIG. 1 is a schematic perspective view illustrating a coil component according to a first exemplary embodiment in the present disclosure. FIG. 2 is an exploded perspective view of FIG. 1. FIG. 3 is a view illustrating a mold portion of FIG. 1 when viewed from below. FIG. 4 is a cross-sectional view of FIG. 1 taken along line I-I'. FIG. 5 is a cross-sectional view of FIG. 1 taken along line II-II'. Meanwhile, in order to more clearly show connection relationships between elemental constituents in the present disclosure, an insulating layer outside a body is omitted in the drawings.

Referring to FIGS. 1 through 5, the coil component 1000 according to the first exemplary embodiment in the present disclosure may include a body B including a mold portion 100 and a cover portion 200, a wound coil 300, and first and second external electrodes 400 and 500.

The body B may include a mold portion 100 and a cover portion 200. The mold portion 100 may include a base portion 110 and a core 120. In addition, the base portion 110 may include first and second recesses R1 and R2.

The body B may form an appearance of the coil component 1000 according to the present exemplary embodiment, and the wound coil 300 may be embedded in the body B.

The body B may generally have a hexahedral shape.

Based on FIG. 1, the body B may have a first surface 101 and a second surface 102 opposing each other in the length direction L, a third surface 103 and a fourth surface 104 opposing each other in the width direction W, and a fifth surface 105 and a sixth surface 106 opposing each other in the thickness direction T. The first to fourth surfaces 101 to 104 of the body B may be wall surfaces of the body B that connect the fifth surface 105 and the sixth surface 106 of the body B to each other. Hereinafter, opposite end surfaces of the body B may refer to the first surface 101 and the second surface 102 of the body B, respectively, opposite side surfaces of the body B may refer to the third surface 103 and the fourth surface 104 of the body B, respectively, and the one surface and the other surface of the body B may refer to the sixth surface 106 and the fifth surface 105 of the body B, respectively.

The body B may be formed so that the coil component 1000 according to the present exemplary embodiment in which the external electrodes 400 and 500 to be described below are formed, for example, has a length of 2.0 mm, a width of 1.2 mm, and a thickness of 0.65 mm, or has a length of 1.4 mm, a width of 1.2 mm, and a thickness of 0.5 mm, but is not limited thereto. Meanwhile, the above-described numerical values are merely design values in which process errors and the like are not reflected. Thus, numerical values including process errors in an allowable range may be considered to fall within the scope of the present disclosure.

Based on a photograph of a cross section of the coil component 1000 in the length direction L-thickness direction T taken at a central portion thereof in the width direction W using an optical microscope or a scanning electron microscope (SEM), the above-mentioned length of the coil component 1000 may refer to a maximum value among dimensions of a plurality of line segments parallel to the length direction L, each connecting two outermost boundary lines opposing each other in the length direction L of the coil component 1000 illustrated in the photograph of the cross section thereof. Alternatively, the length of the coil component 1000 may refer to a minimum value among dimensions of a plurality of line segments parallel to the length direction L, each connecting two outermost boundary lines opposing each other in the length direction L of the coil component 1000 illustrated in the photograph of the cross section thereof. Alternatively, the length of the coil component 1000 may refer to an arithmetic mean value of at least three among dimensions of a plurality of line segments parallel to the length direction L, each connecting two outermost boundary lines opposing each other in the length direction L of the coil component 1000 illustrated in the photograph of the cross section thereof. Here, the plurality of line segments parallel to the length direction L may be equally spaced from each other in the thickness direction T, but the scope of the present disclosure is not limited thereto.

Based on a photograph of a cross section of the coil component 1000 in the length direction L-thickness direction T taken at a central portion thereof in the width direction W using an optical microscope or a scanning electron microscope (SEM), the above-mentioned thickness of the coil component 1000 may refer to a maximum value among dimensions of a plurality of line segments parallel to the thickness direction T, each connecting two outermost boundary lines opposing each other in the thickness direction T of the coil component 1000 illustrated in the photograph of the cross section thereof. Alternatively, the thickness of the coil component 1000 may refer to a minimum value among dimensions of a plurality of line segments parallel to the thickness direction T, each connecting two outermost boundary lines opposing each other in the thickness direction T of the coil component 1000 illustrated in the photograph of the cross section thereof. Alternatively, the thickness of the coil component 1000 may refer to an arithmetic mean value of at least three among dimensions of a plurality of line segments parallel to the thickness direction T, each connecting two outermost boundary lines opposing each other in the thickness direction T of the coil component 1000 illustrated in the photograph of the cross section thereof. Here, the plurality of line segments parallel to the thickness direction T may be equally spaced from each other in the length direction L, but the scope of the present disclosure is not limited thereto.

Based on a photograph of a cross section of the coil component 1000 in the length direction L-width direction W taken at a central portion thereof in the thickness direction T using an optical microscope or a scanning electron microscope (SEM), the above-mentioned width of the coil component 1000 may refer to a maximum value among dimensions of a plurality of line segments parallel to the width direction W, each connecting two outermost boundary lines opposing each other in the width direction W of the coil component 1000 illustrated in the photograph of the cross section thereof. Alternatively, the width of the coil component 1000 may refer to a minimum value among dimensions of a plurality of line segments parallel to the width direction W, each connecting two outermost boundary lines opposing each other in the width direction W of the coil component 1000 illustrated in the photograph of the cross section thereof. Alternatively, the width of the coil component 1000 may refer to an arithmetic mean value of at least three among dimensions of a plurality of line segments parallel to the width direction W, each connecting two outermost boundary lines opposing each other in the width direction W of the coil component 1000 illustrated in the photograph of the cross section thereof. Here, the plurality of line segments parallel to the width direction W may be equally spaced from each other in the length direction L, but the scope of the present disclosure is not limited thereto.

Alternatively, each of the length, width, and thickness of the coil component 1000 may be measured by a micrometer measurement method. In the micrometer measurement method, each of the length, width, and thickness of the coil component 1000 may be measured by setting a zero point using a micrometer having gage repeatability and reproducibility (R&R), inserting the coil component 1000 according to the present exemplary embodiment between tips of the micrometer, and turning a measurement lever of the micrometer. Meanwhile, concerning the measurement of the length of the coil component 1000 by the micrometer measurement method, the length of the coil component 1000 may refer to a value measured once, or may refer to an arithmetic mean of values measured multiple times. The same may also be applied to the width and the thickness of the coil component 1000.

In the coil component 1000 according to the present exemplary embodiment, the body B may include a mold portion 100 and a cover portion 200 disposed on one surface of the mold portion 100. Referring to FIGS. 1 through 5, side surfaces of the mold portion 100 and the cover portion 200 may constitute the first to fourth surfaces 101 to 104 of the body B, and one surface of the cover portion 200 (an upper surface of the cover portion 200 based on the directions of FIG. 1) may constitute the fifth surface 105 of the body B, and the other surface of the mold portion 100 (a lower surface of the mold portion 100 based on the directions of FIG. 1) may constitute the sixth surface 106 of the body B. Hereinafter, the other surface of the mold portion 100 and the sixth surface of the body B may be used in the same meaning.

The mold portion 100 may have one surface and the other surface opposing each other. The mold portion 100 may include a base portion 110 and a core 120. The base portion 110 may support the wound coil 300. The core 120 may be disposed to penetrate through the wound coil 300 and protrude from one surface of the base portion 110 at a central portion thereof. For the above reason, in the present specification, one surface and the other surface of the mold portion 100 may be used in the same meaning as one surface and the other surface of the base portion 110, respectively.

When a thickness (a dimension in the T direction) of the base portion 110 is less than 200 μm, it may be difficult to secure rigidity. Thus, the thickness of the base portion 110 may be 200 μm or more, but is not limited thereto.

Referring to FIGS. 2 and 3, the base portion 110 may include first and second recesses R1 and R2 formed in a shape corresponding to a shape of first and second lead-out portions 331 and 332 of the wound coil 300 to be described below to accommodate the first and second lead-out portions 331 and 332 therein. Each of the first and second recesses R1 and R2 may be formed in one side surface of the base portion 110 along the thickness direction (T direction), and extend to the other surface 106 of the base portion 110 in the width direction (W direction). The first and second recesses R1 and R2 may be disposed side by side in the length direction (L direction).

The cover portion 200 may cover the mold portion 100 and the wound coil 300 to be described below. The cover portion 200 may be disposed on the base portion 110 and the core 120 of the mold portion 100 and the wound coil 300, and then pressed to be joined to the mold portion 100. At this time, when the recesses R1 and R2 are formed in the base portion 110, the cover portion 200 may be joined to the mold portion 100 while filling the recesses R1 and R2. Accordingly, when the cover portion 200 includes a magnetic material, the same ingredient as that of the magnetic material of the cover portion 200 may be disposed in the recesses R1 and R2.

At least one of the mold portion 100 and the cover portion 200 may include a magnetic material. In the present exemplary embodiment, both the mold portion 100 and the cover portion 200 include a magnetic material. The mold portion 100 may be formed by filling a mold for forming the mold portion 100 with a magnetic material. Alternatively, the mold portion 100 may be formed by filling a mold with a composite material including a magnetic material and an insulating resin. A molding process of applying high temperature and high pressure to the magnetic material or composite material in the mold may be additionally performed, but the formation of the mold portion 100 is not limited thereto. Alternatively, the mold portion 100 may be formed through a molding process of applying high temperature and high pressure to a mold with respect to magnetic composite sheets in which a magnetic material is dispersed in an insulating resin, but is not limited thereto.

The base portion 110 and the core 120 may be integrally formed by a mold. Meanwhile, the recesses R1 and R2 may also be formed by a mold.

The cover portion 200 may be formed by disposing magnetic composite sheets in which a magnetic material is dispersed in an insulating resin on the mold portion 100, and then heating and pressing the magnetic composite sheets. When the wound coil 300 to be described below is disposed and the cover portion 200 is formed by stacking sheets after the mold portion 100 is formed under the high-temperature and high-pressure conditions, the mold portion 100 may have a higher fill ratio of magnetic material than the cover portion 200. Here, the fill ratio of magnetic material refers to a fraction of a part occupied by the magnetic material in a space filled with magnetic material particles. The fill ratio may be determined by using an image processing software to process an optical micrograph or electron micrograph of a cross section of the coil component 1000 in the length direction L-thickness direction T taken at a central portion thereof in the width direction W. Other methods and/or tools appreciated by one of ordinary skill in the art, even if not described in the present disclosure, may also be used.

The magnetic material included in the mold portion 100 and the cover portion 200 may be ferrite or magnetic metal powder particles.

The ferrite powder may be, for example, one or more of spinel type ferrite such as Mg—Zn-based ferrite, Mn—Zn-based ferrite, Mn—Mg-based ferrite, Cu—Zn-based ferrite, Mg—Mn—Sr-based ferrite, or Ni—Zn-based ferrite, hexagonal ferrite such as Ba—Zn-based ferrite, Ba—Mg—based ferrite, Ba—Ni-based ferrite, Ba—Co-based ferrite, or Ba—Ni—Co-based ferrite, garnet type ferrite such as Y-based ferrite, and Li-based ferrite.

The metal magnetic powder may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the metal magnetic powder may be one or more of pure iron powder, Fe—Si-based alloy powder, Fe—Si—Al-based alloy powder, Fe—Ni-based alloy powder, Fe—Ni—Mo-based alloy powder, Fe—Ni—Mo—Cu-based alloy powder, Fe—Co-based alloy powder, Fe—Ni—Co-based alloy powder, Fe—Cr-based alloy powder, Fe—C—Si-based alloy powder, Fe—Si—Cu—Nb-based alloy powder, Fe—Ni—Cr-based alloy powder, and Fe—Cr—Al-based alloy powder.

The metal magnetic powder may be amorphous or crystalline. For example, the metal magnetic powder may be Fe—Si—B—Cr-based amorphous alloy powder, but is not necessarily limited thereto.

Each of the ferrite and the metal magnetic powder may have an average particle diameter of about 0.1 μm to 30 μm, but is not limited thereto.

Each of the mold portion 100 and the cover portion 200 may include two or more types of magnetic materials. Here, the different types of magnetic materials mean that the magnetic materials are distinguished from each other in terms of any one of average particle diameter, composition, crystallinity, and shape.

The insulating resin may include an epoxy, a polyimide, a liquid crystal polymer (LCP), or a mixture thereof, but is not limited thereto.

The wound coil 300 may be embedded in the body B to exhibit characteristics of the coil component. For example, when the coil component 1000 according to the present exemplary embodiment is utilized as a power inductor, the wound coil 300 may serve to stabilize power of an electronic device by storing an electric field as a magnetic field and maintaining an output voltage.

The wound coil 300 may be disposed in the body B, and the first and second lead-out portions 331 and 332 may be exposed to the surface of the body B. Specifically, the wound coil 300 may include a wound portion forming one or more turns around the core 120 on the base portion 110, and first and second lead-out portions 331 and 332 exposed to the sixth surface 106 of the body B while being spaced apart from each other. The first and second lead-out portions 331 and 332 may be accommodated in and along the first and second recesses R1 and R2 of the base portion 110, respectively, with one ends thereof being connected to the wound portion and the other ends thereof being exposed to the sixth surface 106 of the body B to be connected to the first and second external electrodes 400 and 500 to be described below, respectively.

The wound coil 300 may be an air-core coil and may be constituted by a rectangular coil. The wound coil 300 may be formed by winding a conductive metal, and may be coated with an insulating coating layer IF except for portions contacting the external electrodes 400 and 500 to be described below. Specifically, the wound coil 300 may be formed by spirally winding a metal wire such as a copper (Cu) wire of which a surface is coated with an insulating coating layer IF. Therefore, an entire surface of each of the plurality of turns of the wound coil 300 may be coated with an insulating coating layer IF. Meanwhile, the metal wire may be a rectangular wire, but is not limited thereto. When the wound coil 300 is formed of a rectangular wire, each turn of the wound coil 300 may have a rectangular cross section as illustrated in FIGS. 4 and 5 as an example.

The wound coil 300 may form a plurality of turns from the core 120 toward the outside of the body B along the length direction (L direction) of the body B or the width direction (W direction) of the body B. The core 120 may be disposed in an air core of the wound coil 300, and the wound coil 300 may have an upper surface and a lower surface in a ring-like shape as a whole, and an inner side surface and an outer side surface connecting the upper surface and the lower surface to each other, and thus may have a cylindrical shape in which a cylindrical hollow is formed in a center portion thereof.

Referring to FIG. 1, the first and second lead-out portions 331 and 332, which are opposite end portions of the wound coil 300, may be exposed to the sixth surface 106 of the body B while being spaced apart from each other. Specifically, the first and second lead-out portions 331 and 332 may extend from the wound portion, where the turns of the wound coil 300 are formed, and may be bent to be accommodated in the first and second recesses R1 and R2, respectively, on the third surface 103 of the body B, and bent one more time to be accommodated in the first and second recesses R1 and R2, respectively, on the sixth surface 106 of the body B.

An insulating coating layer IF may be formed on surfaces of the first and second lead-out portions 331 and 332, but the insulating coating layer IF may be removed from regions exposed to the sixth surface 106 of the body B of the first and second lead-out portions 331 and 332.

The insulating coating layer IF may include an epoxy, a polyimide, a liquid crystal polymer (LCP), or a mixture thereof, but is not limited thereto.

The first and second external electrodes 400 and 500 may be spaced apart from each other on the sixth surface 106 of the body B, that is, on the other surface of the base portion 110, and connected to the first and second lead-out portions 331 and 332 of the wound coil 300, respectively.

The first external electrode 400 may include a first pad portion 410 disposed on the sixth surface 106 of the body B and connected in contact with the first lead-out portion 331, and a first extension portion 420 extending from the first pad portion 410 to the first surface 101 of the body B.

The second external electrode 500 may include a second pad portion 510 disposed on the sixth surface 106 of the body B and connected in contact with the second lead-out portion 332, and a second extension portion 520 extending from the second pad portion 510 to the second surface 102 of the body B.

The first pad portion 410 of the first external electrode 400 and the second pad portion 510 of the second external electrode 500 may be spaced apart from each other on the sixth surface 106 of the body B not to contact each other.

Referring to FIGS. 1 and 4, the first and second external electrodes 400 and 500 may extend from the sixth surface 106 of the body B to the first and second surfaces 101 and 102 of the body B, respectively. Although the first and second surfaces 101 and 102 of the body B are surfaces to which the wound coil 300 is not drawn, if the external electrodes 400 and 500 are disposed to extend to the first and second surfaces 101 and 102 of the body B, the coil component 1000 may have improved fixing strength and enhanced mechanical properties against vibration, impact, or the like when the coil component 1000 is mounted.

For example, in a case where the coil component 1000 is used in an environment frequently exposed to vibrations or impacts, such as electronic equipment for a vehicle, it is advantageous in terms of mechanical properties that the external electrodes 400 and 500 are formed in an L-shape to be disposed on the first and second surfaces 101 and 102 of the body B as well, although the external electrodes 400 and 500 are electrically connected to the wound coil 300 only on the sixth surface 106 of the body B. Such a shape of the external electrodes 400 and 500 may form a solder fillet when the coil component 1000 is mounted on a board, thereby ensuring fixing strength between the coil component 1000 and the board.

Meanwhile, when the coil component 1000 is mounted in the above-described form, vibrations or impacts may deteriorate bonding forces between the body B and the external electrodes 400 and 500 or between the wound coil 300 and the external electrodes 400 and 500. However, the coil component 1000 may be provided with improved mechanical properties such as bonding force by disposing conductive resin layers 430 and 530 to be described below on the first and second surfaces 101 and 102 of the body B.

The first and second external electrodes 400 and 500 may be formed on the surfaces of the body B by performing electrolytic plating using an insulating layer formed on the surfaces of the body B as a plating resist. When the body B includes magnetic metal powder particles, the magnetic metal powder particles may be exposed to the surfaces of the body B. The metal magnetic powder exposed to the surfaces of the body B may impart conductivity to the surfaces of the body B if electrolytic plating is performed thereon, and thus, the first and second external electrodes 400 and 500 may be formed on the surfaces of the body B by electrolytic plating.

The pad portions 410 and 510 and the extension portions 420 and 520 of the first and second external electrodes 400 and 500 may be formed by the same plating process, and no boundaries may be formed therebetween. That is, the first pad portion 410 and the first extension portion 420 may be integrally formed, and the second pad portion 510 and the second extension portion 520 may be integrally formed. In addition, the pad portions 410 and 510 and the extension portions 420 and 520 may be formed of the same metal. However, the description herein does not exclude from the scope of the present disclosure a case where the pad portions 410 and 510 and the extension portions 420 and 520 are formed by different plating processes, and boundaries are formed therebetween.

Each of the first and second external electrodes 400 and 500 may be formed in a plurality of layers. In the coil component 1000 according to the present exemplary embodiment, each of the first and second the pad portions 410 and 510 may be formed in two layers, and each of the first and second the extension portions 420 and 520 may be formed in three layers.

Referring to FIG. 4, first layers of the first and second the extension portions 420 and 520 contacting the body B may be formed as conductive resin layers 430 and 530, respectively. Each of the conductive resin layers 430 and 530 may be formed as a layer including a resin and a metal ingredient dispersed in the resin. The resin may include an epoxy as a thermosetting resin. The metal ingredient may include a silver (Ag) or a copper (Cu) ingredient. For example, in the present exemplary embodiment, the conductive resin layers 430 and 530 may be Ag epoxy layers or Cu epoxy layers, but are not limited thereto.

Meanwhile, first layers of the first and second pad portions 410 and 510 contacting the body B may be formed as first metal layers 440 and 540. That is, the conductive resin layers 430 and 530 may be included in the first and second extension portions 420 and 520 since they are disposed on the first and second surfaces 101 and 102 of the body B, while not being included in the first and second pad portions 410 and 510 since they do not extend to the sixth surface 106 of the body B. In some embodiments, at least one of the first and second pad portions excludes the conductive resin layer.

The first metal layers 440 and 540 may be included both in the first and second pad portions 410 and 510 and in the first and second extension portions 420 and 520. The first metal layers 440 and 540 may extend from the first and second pad portions 410 and 510 onto the conductive resin layers 430 and 530 of the first and second extension portions 420 and 520 to cover the conductive resin layers 430 and 530, respectively. That is, the first metal layers 440 and 540 may serve as both first layers of the first and second pad portions 410 and 510 and second layers of the first and second extension portions 420 and 520. The first metal layers 440 and 540 may include nickel (Ni), but are not limited thereto.

Second metal layers 450 and 550 may be included both in the first and second pad portions 410 and 510 and in the first and second extension portions 420 and 520. The second metal layers 450 and 550 may be disposed to cover the first metal layers 440 and 540 in the first and second pad portions 410 and 510 and in the first and second extension portions 420 and 520. That is, the second metal layers 450 and 550 may serve as both second layers of the first and second pad portions 410 and 510 and third layers of the first and second extension portions 420 and 520. The second metal layers 450 and 550 may include tin (Sn), but are not limited thereto.

When the first metal layers 440 and 540 including nickel (Ni) are interposed between the conductive resin layers 430 and 530 and the second metal layers 450 and 550 including tin (Sn) as described above, one or more of a tin (Sn) ingredient of the second metal layers 450 and 550 intruding in a direction toward the body B, a nickel (Ni) ingredient of the first metal layers 440 and 540, and a silver (Ag) and/or copper (Cu) ingredient of the conductive resin layers 430 and 530 may form an intermetallic compound (IMC), thereby effectively preventing the tin (Sn) ingredient in solder or the second metal layers 450 and 550 from intruding into interfaces and deteriorating an inductor. The conductive resin layers 430 and 530 may be formed by coating and curing a conductive paste including a conductive powder containing silver (Ag) and/or copper (Cu) and an insulating resin such as epoxy.

Referring to FIG. 4, in the coil component 1000 according to the present exemplary embodiment, the first and second lead-out portions 331 and 332 may be in contact with the first metal layers 440 and 540 on the sixth surface 106 of the body B, and the body B may be in contact with the conductive resin layers 430 and 530 on the first and second surfaces 101 and 102 of the body B.

The conductive resin layers 430 and 530 may include a resin ingredient, which has flexibility or elasticity, and thus may have more strong resistance to vibrations or impacts as compared with the metal layers.

Therefore, in the coil component 1000 according to the present exemplary embodiment, since the conductive resin layers 430 and 530 are disposed as first layers in the first and second extension portions 420 and 520 that are directly connected to the first and second surfaces 101 and 102 of the body B, the resin ingredient of the body B and the resin ingredient of the conductive resin layers 430 and 530 may bond together, thereby enhancing bonding strength and flexibility.

In addition, in the coil component 1000 according to the present exemplary embodiment, since the first metal layers 440 and 540 are disposed as first layers in the first and second pad portions 410 and 510 of the first and second external electrodes 400 and 500 that are connected to the first and second lead-out portions 331 and 332, thereby enhancing electrical conductivity and bonding strength between the wound coil 300 and the first and second external electrodes 400 and 500. Additionally, it is possible to reduce a resistive ingredient (Rdc) between the first and second lead-out portions 331 and 332 and the first and second pad portions 410 and 510, as compared with that in a case where the conductive resin layers 430 and 530 having intrinsic resistivity are also disposed as first layers in the first and second pad portions 410 and 510.

Meanwhile, although not illustrated in the drawings, the coil component 1000 according to the present exemplary embodiment may further include an insulating layer disposed on the sixth surface 106 of the body B except for regions contacting the external electrodes 400 and 500. The insulating layer may be used as a plating resist at the time of electrolytic plating for forming the external electrodes 400 and 500, but is not limited thereto. In addition, the insulating layer may also be disposed at least partially on the first to fifth surfaces 101 to 105 of the body B.

Second Exemplary Embodiment

Figure 6:
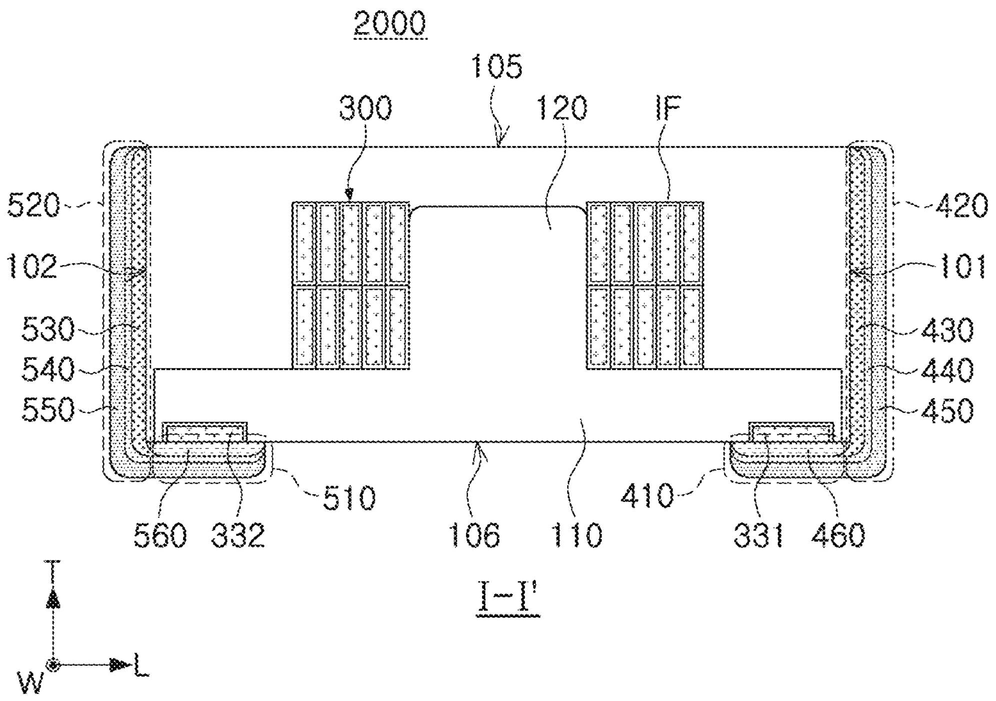
FIG. 6 is a view illustrating a coil component according to a second exemplary embodiment in the present disclosure, and corresponding to FIG. 4.

FIG. 6 is a view illustrating a coil component 2000 according to a second exemplary embodiment in the present disclosure, and corresponding to FIG. 4.

Referring to FIG. 6, the coil component 2000 according to the present exemplary embodiment is different from the coil component 1000 according to the first exemplary embodiment in the present disclosure in the layered structure of the first and second pad portions 410 and 510. Thus, in describing the present exemplary embodiment, only the layered structure of the first and second pad portions 410 and 510, which is different from that in the first exemplary embodiment, will be described. Concerning the other configuration of the present exemplary embodiment, what has been described above for the first exemplary embodiment in the present disclosure may be identically applied thereto.

In the coil component 2000 according to the present exemplary embodiment, each of the first and second pad portions 410 and 510 may be formed in three layers, and each of the first and second extension portions 420 and 520 may also be formed in three layers. However, the first layers of the first and second pad portions 410 and 510 may be third metal layers 460 and 560, and the first layers of the first and second extension portions 420 and 520 may be conductive resin layers 430 and 530.

Referring to FIG. 6, the third metal layers 460 and 560 may be disposed between the sixth surface 106 of the body B and the first metal layers 440 and 540. The third metal layers 460 and 560 may serve as the first layers of the first and second pad portions, and may be connected in contact with the first and second lead-out portions 331 and 332.

The third metal layers 460 and 560 may be included in the first and second pad portions 410 and 510 since they are disposed on the sixth surface 106 of the body B, while not being included in the first and second extension portions 420 and 520 since they do not extend to the first and second surfaces 101 and 102 of the body B. The third metal layers 460 and 560 may include copper (Cu), but are not limited thereto.

In the coil component 2000 according to the present exemplary embodiment, since the third metal layers 460 and 560 are disposed between the first and second lead-out portions 331 and 332 and the first metal layers 440 and 540, and both the third metal layers 460 and 560 and the wound coil 300 include a copper (Cu) ingredient, it is possible to enhance electrical conductivity and mechanical bonding force between the first and second lead-out portions 331 and 332 and the first and second external electrodes 400 and 500.

Additionally, by disposing the third metal layers 460 and 560 on the innermost sides of the first and second pad portions 410 and 510, one or more of a tin (Sn) ingredient of the second metal layers 450 and 550 intruding in a direction toward the body B, a nickel (Ni) ingredient of the first metal layers 440 and 540, and a copper (Cu) ingredient of the third metal layers 460 and 560 may form an intermetallic compound (IMC), thereby effectively preventing the tin (Sn) ingredient in solder or the second metal layers 450 and 550 from intruding into the lead-out portions 331 and 332 and deteriorating an inductor.

Third Exemplary Embodiment

Figure 7:
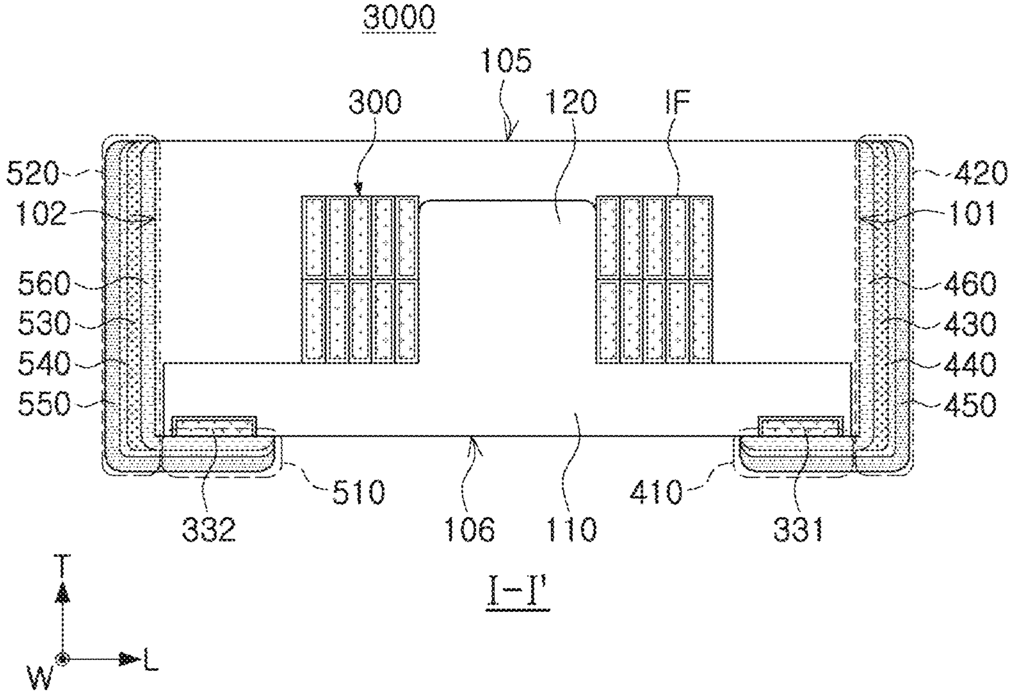
FIG. 7 is a view illustrating a coil component according to a third exemplary embodiment in the present disclosure, and corresponding to FIG. 4.

FIG. 7 is a view illustrating a coil component 3000 according to a third exemplary embodiment in the present disclosure, and corresponding to FIG. 4.

Referring to FIG. 7, the coil component 3000 according to the present exemplary embodiment is different from the coil component 1000 according to the first exemplary embodiment in the present disclosure in the layered structures of the first and second pad portions 410 and 510 and the first and second extension portions 420 and 520. Thus, in describing the present exemplary embodiment, only the layered structures of the first and second pad portions 410 and 510 and the first and second extension portions 420 and 520, which are different from those in the first exemplary embodiment, will be described. Concerning the other configuration of the present exemplary embodiment, what has been described above for the first exemplary embodiment in the present disclosure may be identically applied thereto.

In the coil component 3000 according to the present exemplary embodiment, each of the first and second pad portions 410 and 510 may be formed in three layers, and each of the first and second extension portions 420 and 520 may also be formed in four layers.

Referring to FIG. 7, the third metal layers 460 and 560 may be disposed between the sixth surface 106 of the body B and the first metal layers 440 and 540. The third metal layers 460 and 560 may serve as the first layers of the first and second pad portions, and may be connected in contact with the first and second lead-out portions 331 and 332.

The third metal layers 460 and 560 may be included in the first and second pad portions 410 and 510 since they are disposed on the sixth surface 106 of the body B, and may also be included in the first and second extension portions 420 and 520 since they extend to the first and second surfaces 101 and 102 of the body B. That is, the third metal layers 460 and 560 may serve as both the first layers of the first and second pad portions 410 and 510 and the first layers of the first and second extension portions 420 and 520. The third metal layers 460 and 560 may include copper (Cu), but are not limited thereto.

By removing the insulating layer from the first and second surfaces 101 and 102 of the body B in the first and second extension portions 420 and 520 through laser ablation or the like, forming the third metal layers 460 and 560, and then forming the conductive resin layers 430 and 530, when the conductive resin layers 430 and 530 include a copper (Cu) ingredient, it is possible to enhance mechanical bonding force between the conductive resin layers 430 and 530 and the third metal layers 460 and 560 including the same ingredient.

In addition, since the first layers of the pad portions 410 and 510 and the first layers of the extension portions 420 and 520 are integrally formed as the third metal layers 460 and 560, it is possible to enhance overall fixing strength between the body B and the external electrodes 400 and 500.

Additionally, by disposing the third metal layers 460 and 560 on the innermost sides of the first and second external electrodes 400 and 500, one or more of a tin (Sn) ingredient of the second metal layers 450 and 550 intruding in a direction toward the body B, a nickel (Ni) ingredient of the first metal layers 440 and 540, a silver (Ag) and/or copper (Cu) ingredient of the conductive resin layers 430 and 530, and a copper (Cu) ingredient of the third metal layers 460 and 560 may form an intermetallic compound (IMC), thereby effectively preventing the tin (Sn) ingredient from intruding into interfaces and the lead-out portions 331 and 332 and deteriorating an inductor.

As set forth above, according to the exemplary embodiments in the present disclosure, it is possible to provide a coil component not only having improved conductivity and fixing strength between the lead-out portions and the external electrodes in the coil component, but also having strong resistance to vibrations or impacts when the coil component is mounted on a board.

While exemplary embodiments have been shown and described above, it will be apparent to those skilled in the art that modifications and variations could be made without departing from the scope of the present disclosure as defined by the appended claims.

What is claimed is:

1. A coil component comprising:

a body having one surface and the other surface opposing each other, and one end surface and the other end surface each connecting the one surface and the other surface to each other and opposing each other;

a wound coil disposed in the body;

first and second lead-out portions extending from opposite ends of the wound coil to one surface of the body and spaced apart from each other; and first and second external electrodes disposed on the body and connected to the first and second lead-out portions, respectively, and each of the first and second external electrodes includes a plurality of layers, wherein the first and second external electrodes include first and second pad portions spaced apart from each other on one surface of the body and connected to the first and second lead-out portions, respectively, and first and second extension portions extending from the first and second pad portions and disposed on one end surface and the other end surface of the body, respectively, and first layers of the first and second extension portions are conductive resin layers, and first layers of the first and second pad portions are first metal layers.

2. The coil component of claim 1, wherein the first metal layers extend onto the conductive resin layers.

3. The coil component of claim 2, wherein the first and second external electrodes further include second metal layers covering the first metal layers, respectively.

4. The coil component of claim 3, wherein the second metal layers include tin (Sn).

5. The coil component of claim 1, wherein the conductive resin layers include a resin and a metal ingredient disposed in the resin.

6. The coil component of claim 5, wherein the resin is a thermosetting resin, and the metal ingredient includes at least one of silver (Ag) and copper (Cu).

7. The coil component of claim 1, wherein the first metal layers include nickel (Ni).

8. The coil component of claim 1, wherein the first and second pad portions further include third metal layers disposed between the body and the first metal layers.

9. The coil component of claim 8, wherein the third metal layers extend between the body and the conductive resin layers.

10. The coil component of claim 8, wherein the third metal layers include copper (Cu).

11. The coil component of claim 8, wherein both the third metal layers and the wound coil include copper (Cu).

12. The coil component of claim 1, wherein the body includes a mold portion and a cover portion, and the wound coil is disposed between the mold portion and the cover portion.

13. The coil component of claim 12, wherein the mold portion includes a base portion having one surface and the other surface opposing each other, and a core disposed at a central portion of one surface of the base portion and penetrating through the wound coil.

14. The coil component of claim 13, wherein the base portion includes first and second recesses accommodating the first and second lead-out portions, respectively.

15. The coil component of claim 12, wherein each of the mold portion and the cover portion includes a magnetic material, and the mold portion has a higher fill ratio of magnetic material than the cover portion.

16. The coil component of claim 12, wherein both the mold portion and the conductive resin layers include epoxy.

17. The coil component of claim 1, wherein the wound coil includes a conductive metal, and is coated with an insulating coating layer except for regions contacting the first and second external electrodes.

18. The coil component of claim 1, wherein at least one of the first and second pad portions excludes the conductive resin layer.

19. The coil component of claim 18, wherein both of the first and second pad portions exclude the conductive resin layers.

* * * * *